United States Patent [19]
Loomis et al.

[11] Patent Number: 5,838,277
[45] Date of Patent: Nov. 17, 1998

[54] GPS-BASED CONTROLLER MODULE

[75] Inventors: Peter Van Wyck Loomis, Sunnyvale; Kevin McKenzie Reeds, Palo Alto, both of Calif.

[73] Assignee: Trimble Navigation Limited, Sunnyvale, Calif.

[21] Appl. No.: 800,158

[22] Filed: Feb. 13, 1997

Related U.S. Application Data

[63] Continuation of Ser. No. 245,609, May 20, 1994.

[51] Int. Cl.$^6$ .............................. G01S 5/02; H04B 7/185; E01C 23/07
[52] U.S. Cl. ........................................... 342/357; 404/84.2
[58] Field of Search ............................ 342/357; 701/213, 701/25, 50; 404/84.1, 84.2, 84.8

[56] References Cited

U.S. PATENT DOCUMENTS

| | | | |
|---|---|---|---|
| 5,247,440 | 9/1993 | Capurka et al. | 764/424.05 |
| 5,396,254 | 3/1995 | Toshiyuki | 342/357 |
| 5,442,805 | 8/1995 | Sagers et al. | 342/457 |
| 5,471,391 | 11/1995 | Gudat et al. | 340/995 |
| 5,635,940 | 6/1997 | Hickman et al. | 342/357 |
| 5,646,846 | 7/1997 | Bruce et al. | 221/211 |

*Primary Examiner*—Gregory C. Issing
*Attorney, Agent, or Firm*—Patrick T. King

[57] ABSTRACT

A GPS-based integrated controller module combines in a single integrated package or module a GPS receiver, a map, and a logic or decision module which provides an output control signal or control code. The map of the integrated module provides various representations. Continuous functions are provided with various types of coordinate systems, which can use interpolation between reference points in a grid system, or Taylor series representations. The integrated module performs discrete output functions such as providing a control code or a user's location either within or out of a particular closed area or polygonal zone, where each location shares a common characteristics with the other locations in the zone.

1 Claim, 4 Drawing Sheets

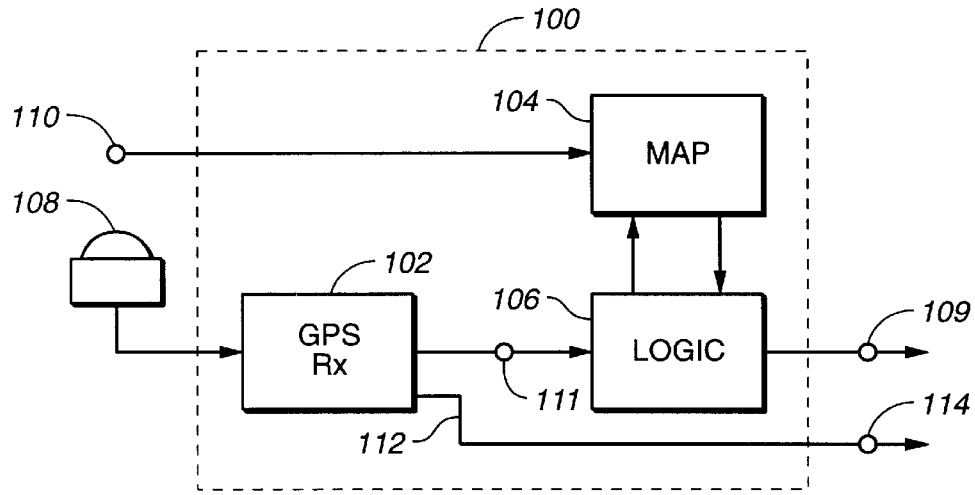
FIG._1
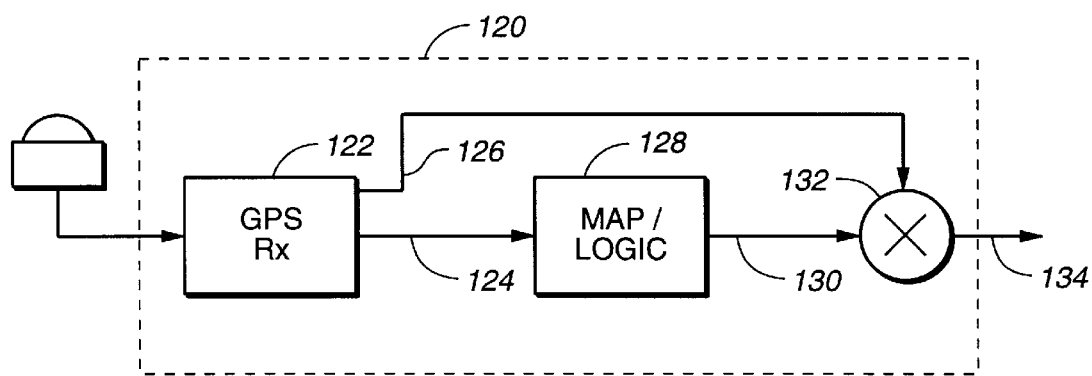
FIG._2
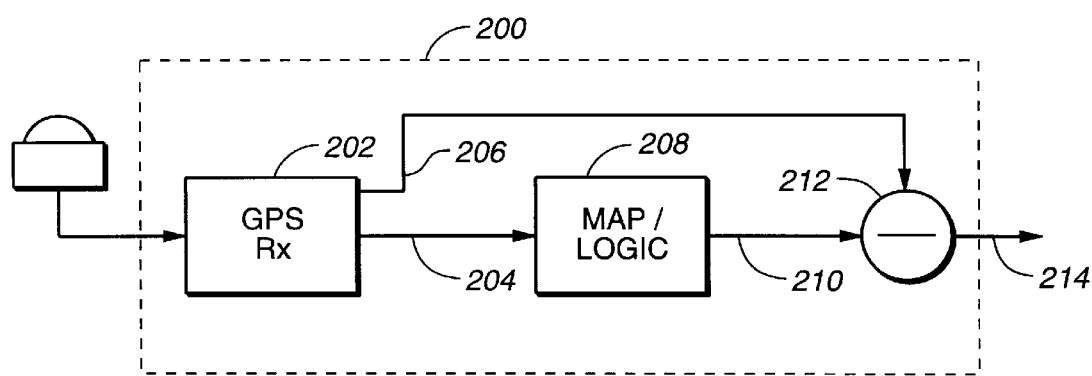
FIG._5

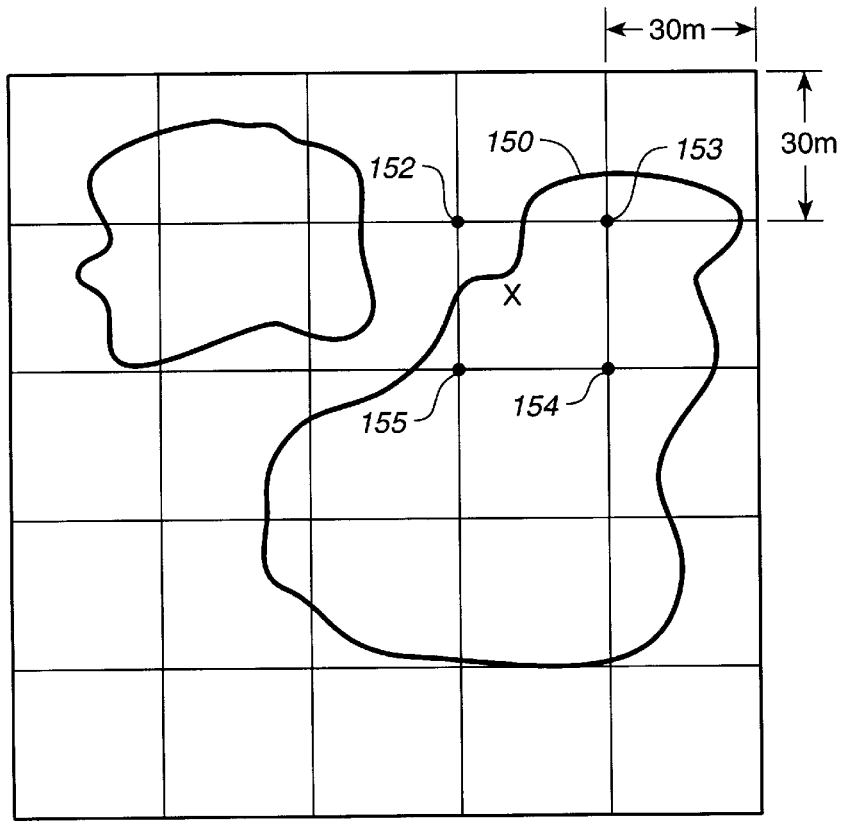
FIG._3
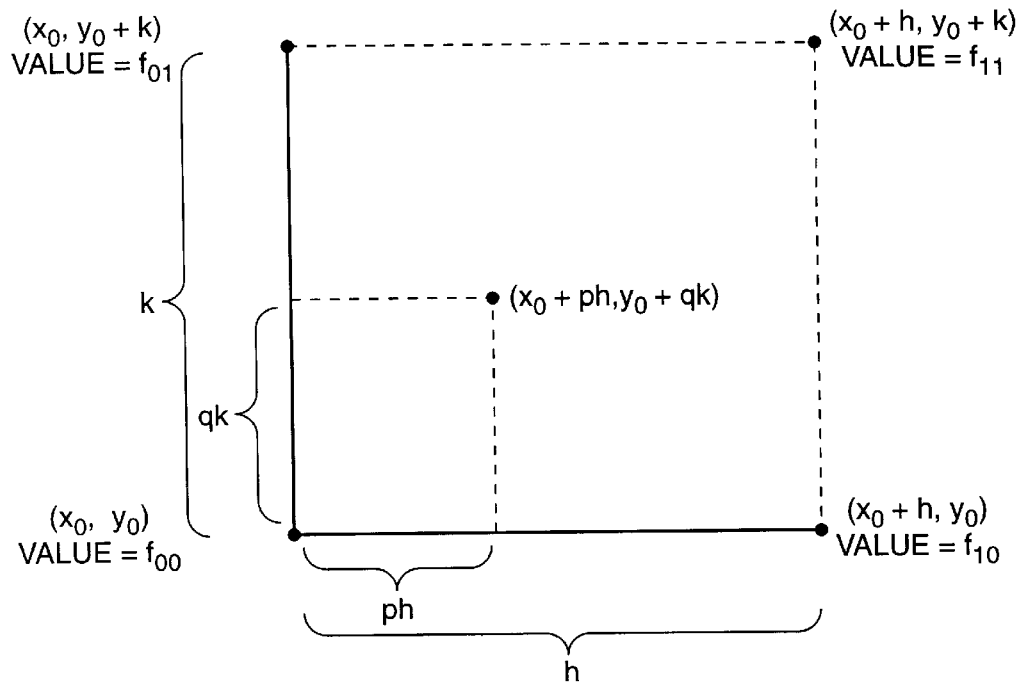
FIG._4A

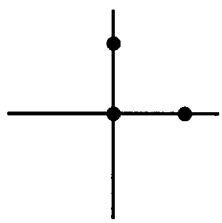
$f(x_0 + ph, y_0 + qk) = (1 - p - q) f_{0,0}$
$+ pf_{1,0} + qf_{0,1} + o(h^2)$
FIG._4B
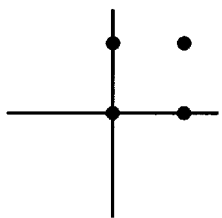
$f(x_0 + ph, y_0 + qk) = (1 - p)(1 - q) f_{0,0}$
$+ p(1 - q) f_{1,0} + q(1-p) f_{0,1}$
$+ pqf_{1,1} + o(h^2)$
FIG._4C
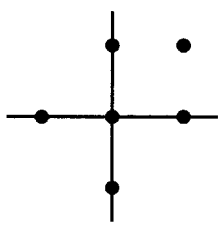
$f(x_0 + ph, y_0 + qk) = \dfrac{q(q-1)}{2} f_{0,-1}$
$+ \dfrac{p(p-1)}{2} f_{-1,0} + (1 + pq - p^2 - q^2) f_{0,0}$
$+ \dfrac{p(p - 2q + 1)}{2} f_{1,0} + \dfrac{q(q - 2p + 1)}{2} f_{0,1}$
$+ pqf_{1,1} + o(h^3)$
FIG._4D

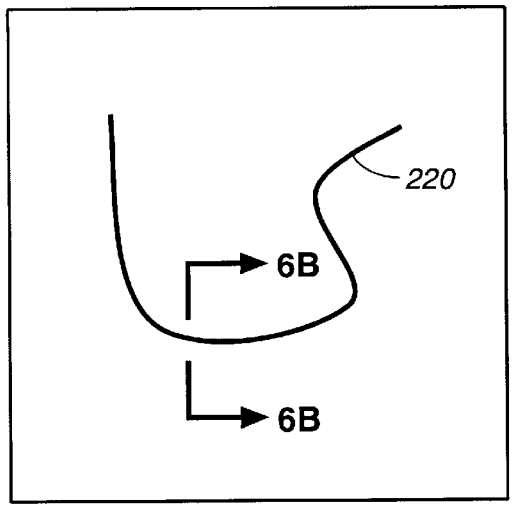
FIG._6A
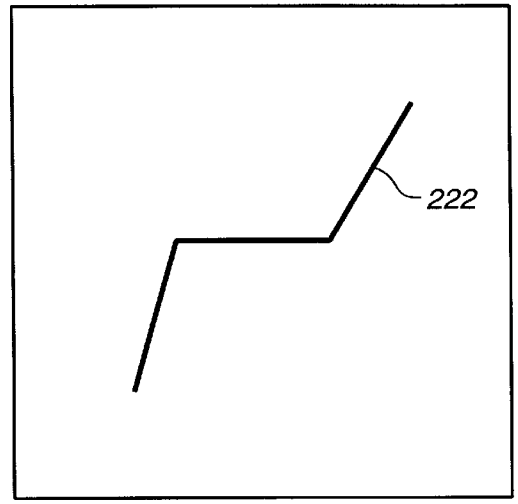
FIG._6B
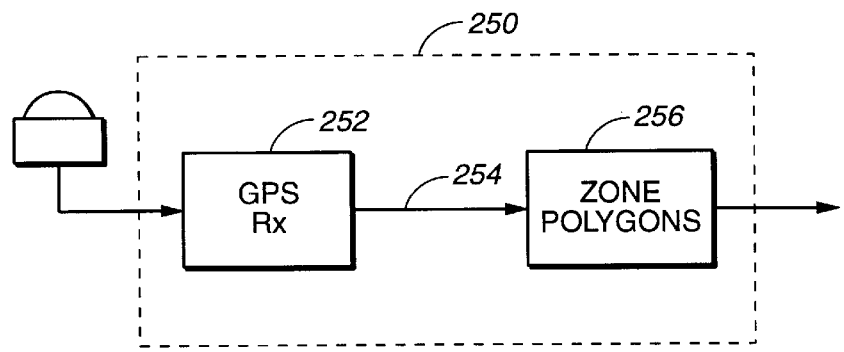
FIG._7
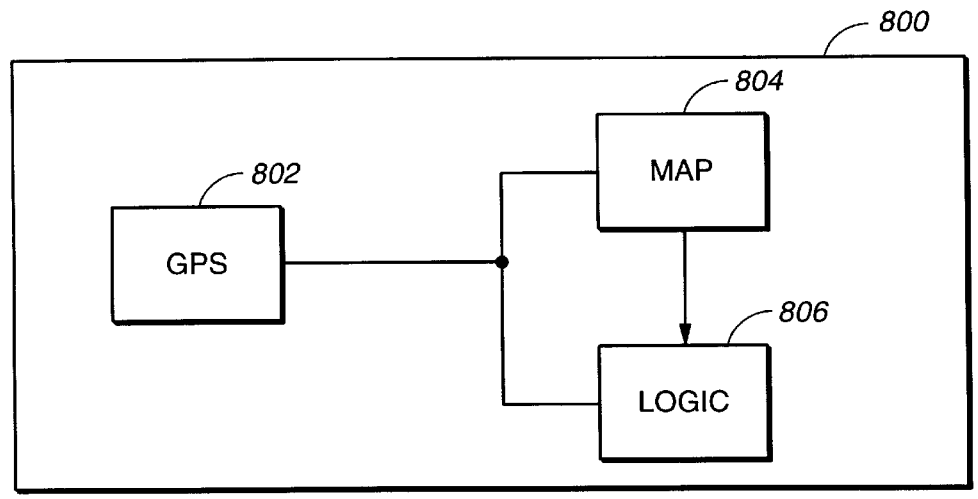
FIG._8

GPS-BASED CONTROLLER MODULE

This is a continuation of copending application Ser. No. 08/245,609 filed on May 20 1994.

BACKGROUND OF THE INVENTION

1. Field of the Invention

This invention relates to a Global Positioning System (GPS) systems and, more particularly, to applications of GPS information to decision making systems or controllers.

2. Prior Art

GPS systems provide geographic position information in a latitude-andlongitude format in units of degrees, minutes, and seconds. For many non-navigational applications, this geographic information in itself is not of interest to a user. Rather than being provided with geographic position information in terms of latitude and longitude, a user often would prefer that a control signal be provided, where that control signal would be based on a characteristic of a particular geographic position.

Applications which provide some sort of control functions have typically been large-scale, expensive systems which are used in connection with large pieces of agricultural machinery which dispense mixtures of various chemicals. These systems include separate computer systems with keyboards and video display monitors.

For example, one such large-scale system used with agricultural control systems is described in U.S. Pat. No. 4,630,773, titled "Method and Apparatus for Spreading Fertilizer", invented by Earl W. Ortlip and granted Dec. 12, 1986. A computerized control system holds a digital soil map of the location of various soil types in a field to be fertilized. This system is responsive to Loran vehicle location means. The method includes determining the location of the vehicle in the field, looking up the type of soil the vehicle is currently positioned over and adjusting multi-component feeder operations in response thereto. The method further includes inputting information into a control system whereby product rates of various mixtures of various components are varied according to soil types and conditions.

Another system is disclosed in U.S. Pat. No. 5,220,876, titled "Variable Rate Application System", invented by James J. Monson et al. and granted Jun. 22, 1993. A variable-rate fertilizer spreading apparatus spreads a mixture of various types of fertilizers based upon locations in the field. The location of a vehicle is obtained with a LORAN or GPS system.

Both of the systems described in the Ortlip and Monson patents are expensive and complex agricultural systems. Because of their high cost and complexity, these systems do not address the practical needs of smaller agricultural businesses and the requirements for many other applications. For example, small agricultural businesses may use only a small tractor and only a single tank of one constituent material. Many applications do not need complex mixing systems and elaborate video displays, readouts, and computer systems which are fragile and require high maintenance. A need exists for inexpensive, simpler, control systems which lends itself to being easily ruggedized to use in extreme operational conditions.

Use of GPS geographic position and velocity information for navigational purposes is well known. GPS technology has also been applied to land surveying for making land survey maps by recording geographic position data at one second time intervals and for also displaying geographic position information on a video display unit. This type of application is useful for land surveying. However, land survey information is not very efficiently used by the operator of a grader who is leveling a rice field. What is needed is inexpensive equipment which provides immediately useful control information rather than navigational information or survey information in terms of latitude and longitude.

Consequently, the need has arisen for an integrated module which uses GPS position information or position/velocity information to provide a variety of non-navigational controller functions for various users.

SUMMARY OF THE INVENTION

It is therefore an object of the invention to provide a GPS zone-based controller system which combines in a single integrated package or module a GPS receiver, a map, and a logic or decision module which provides an output control signal or control code. The map of the integrated module provides various representations. Continuous functions are provided with various types of coordinate systems, which can use interpolation between reference points in a grid system, or Taylor series representations. The integrated module performs discrete output functions such as providing a control code or a user's location either within or out of a particular close area or polygonal zone, where each location shares a common characteristics with the other locations in the zone.

The integrated zone-based GPS module is provided which uses GPS position information or position/velocity information to provide a variety of non-navigational controller functions for various users.

All functional elements are combined into an integral unit with no moving parts and with no display means provided. A GPS antenna receives GPS signals. Zone maps, which relate geographic positions to a varible characteristic are externally loaded into the system. Output signals are control signals based on location within a particular zone.

A zone-based Global Positioning System GPS controller module includes three integral parts: a GPS receiver, a zone-base decision means, and mapping means. The global positioning system GPS receiver provides at an output terminal thereof various geographic position information data signals, each of which corresponds to a respective geographic position of a user. The zone-based decision means provides decision signals at its output terminal. The zone mapping means maps geographic position information data into corresponding output zone information data. The output zone information data represents various respective geographic zones in which one or more geographic positions have a common characteristic. The GPS receiver, the mapping means, and the zone-based decision module are combined as an integral unit in a single package or module.

External input means are provided for loading information into the zone mapping means. The zone mapping means includes means for digitally mapping geographic position information data information to zone information data, where each geographic position has a "control value" associated with it. The mapping module includes means for a mapping to a general grid system where the general grid covers a geographic area of variable size with increments of variable size. Means are provided for interpolating between points within the grid system. The mapping module includes means for automatically tracking the geographic position of a user and setting a user time clock based on the geographic position of the user. Means are provided for providing zone-based charges to customers of a user depending upon which zones are entered by the user. The zone-based decision means provides output signals based on geographic position and velocity. The means for mapping also provides an elevation mapping which at a particular two-dimensional position provides an altitude value for that two-dimension position.

The zone mapping means maps various geographic positions into one or more polygonal zones having a predetermined common characteristic. The zone-based decision module includes a controller module which provides a control output signal. The controller module provides predetermined output control signals corresponding to each output zone information data signals, which are provided at an output terminal of the zone mapping means, where each of the output zone information data signals represents input geographic positions having a common characteristic. The predetermined output signals at the output terminal of the zone-based decision means are binary-coded. The predetermined output signals at the output terminal of the zone-based decision means are coded to represent a plurality of predetermined analog or digital control signal values.

The integral GPS-based controller module includes a global positioning system (GPS) receiver for providing at an output terminal thereof geographic information corresponding to a respective geographic position of the controller module. Map means, having an input terminal, are connected to the output terminal of the GPS receiver, for receiving geographic position information data from the GPS receiver and for providing map output information. Logic means are provided having an input terminals connected to the output terminal of the GPS receiver and having an output terminal for providing predetermined logic output values corresponding to geographic position information. The GPS receiver, the map means, and the logic means are combined as an integral unit in a single module.

The predetermined output signals at the output terminal of the logic means represent a plurality of predetermined analog control signal values, a plurality of predetermined digital or binary control signal values.

According to one aspect of the invention, the map means includes closed areas defining predetermined geographic zones having a predetermined common characteristic. The closed areas of the map means includes polygons, the borders of which define predefined geographic zones having a predetermined common characteristic. The closed areas of the map means may also include circular areas defined by a center point and radius.

According to another aspect of the invention, the map means provides a predetermined functional representation of a characteristic as a function of geographic position. The functional representation includes a grid configuration and means for interpolating between reference points of the map means. The functional representation includes a Taylor series representation. The map means includes random access memory RAM, an EEPROM, a PCMCIA card, a memory card, a removable memory, CDROMS, hard and floppy disk drives, optical disks, EPROMs, flash EPROMs, SRAMs, and PROMS.

The method of providing control signals with a GPS-based controller module includes the steps of: Combining a GPS receiver, a logic circuit, and a mapping circuit into an integral GPS-based controller module; receiving GPS signals with the GPS receiver circuit and providing geographic position output information corresponding to the geographic location of the controller module; providing with said mapping circuit a functional representation of a characteristic which varies as a function of geographic position; and providing predetermined logic output values from the logic circuit which correspond to the geographic position of the controller module.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 is an overall system block diagram of a GPS-based controller module: showing a GPS receiver system; a map, and a logic/decision unit.

FIG. 2 illustrates an agricultural controller application for a GPS-based controller module.

FIG. 3 shows a mapping of a grid system which has a given area with grid increments which provides for interpolation between the grid increments.

FIG. 4A illustrates the terminology for bivariate interpolation and FIGS. 4B, 4C, 4D respectively show three-point, four-point, and six-point formulas for bivariate interpolation.

FIG. 5 illustrates a grading controller application for a GPS-based controller module.

FIGS. 6A and 6B illustrate a mapping of a distance along a centerline of a track and distance along a cross-track-line relative to the centerline.

FIG. 7 illustrates a discrete application for a GPS-based controller module using zone polygons.

FIG. 8 shows the arrangement wherein three means (GPS, map, and logic) are coupled, including each of a map means and a logic means having an input connected to the GPS output.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

FIG. 1 shows an overall system block diagram for an integral GPS-based controller module 100 according to the invention. The controller module is formed as a mechanical unit and includes a GPS receiver system 102; a mapping circuit 104, and a logic/decision circuit 106. The GPS receiver system 102, mapping circuit 104, and logic/decision circuit 106 are combined as an integral unit in a single package or module to provide an inexpensive, simply-operated, control systems which lends its self to being easily ruggedized for use in extreme operational conditions. A system according to the invention provides immediately useful control information rather than navigational information or survey information in terms of latitude and longitude. This system uses GPS position information or position/velocity information to provide a variety of non-navigational controller functions for various users.

All functional elements are combined into an integral unit 100 with no moving parts and with no display means provided. A GPS antenna 108 receives GPS signals and the GPS receiver provides output geographical position information, such as latitude, longitude, altitude, or speed, as well as GPS time, as known in the art.

Area maps, which provide function relationships between geographic positions and a variable characteristic, are contained in the mapping circuit 104. A mapping circuit is a memory unit and electronic versions include memory means selected from the group consisting of a random access memory RAM, an EEPROM, a PCMCIA card, a memory card, a removable memory, CDROMS, hard and floppy disk drives, optical disks, EPROMs, flash EPROMs, SRAMs, and PROMS. Means for externally loading information into the mapping circuit are represented by a terminal 110.

The logic circuit 106 of GPS-based controller module 100 provides predetermined control signals at its output terminal 109 which corresponds to geographic information received at its input terminal 111 from the GPS receiver 102. Each geographic position has a control value associated with it, as determined by the map means 104 and the logic 106. The predetermined output signals at the output terminal of the logic means optionally provide several different types of control signals, including predetermined analog control signal values and a plurality of predetermined digital control signal values, which can be binary-valued.

The global positioning system GPS receiver 102 provides at an output terminal various types of GPS geographic information corresponding to the respective geographic position of the module 100 or of the user of the module. Latitude and longitude are usually provided. The GPS geographic information also includes altitude information corresponding to the respective geographic position of a user. The GPS geographic information also may include speed information. Time information signals may also be provided from the GPS system. GPS geographic information is also provided on GPS signal line(s) 112 directly to an output terminal 114 of the module 100.

FIG. 2 illustrates a GPS-based controller module 120 for an example of an agricultural controller application. A global positioning system (GPS) receiver 122 provides on a signal line 124 the geographic position of a user in terms of latitude and longitude. On a signal line 126 is provided information about the speed of a user. The map/logic circuits 128 provides an output signal on signal line 130 indicating how many pounds per lineal foot are to be distributed by, for example, a fertilizer applicator. The speed value on signal line 126 is combined with the signal on line 130 in a multiplier circuit 132 to provide a pounds per second control value on signal line 134. The signal on line 134 is applied, for example, to a control valve. The signal on line 134 can be an analog control signal or a digital or binary control signal.

FIG. 3 shows a mapping of a grid system which has a given area with, for example, 30 meter grid increments which provide for interpolation between the grid increments. A contour line indicates a constant value of a characteristic being mapped by the grid system. As illustrated with FIGS. 4A and 4B, to interpolate to a point x on the grid, the four points 152, 153, 154, 155 are used with the four-point interpolation formula of FIG. 4C. Alternatively, FIGS. 4B AND 4D respectively show three point and six point interpolation formulas. The terms $O(h^2)$ and $O(h^3)$ are error terms.

The mapping includes several different formats. The map provides a predetermined functional representation of a particular variable characteristic as a function of geographic position, altitude, and time, if desired. The representations can be a grid with interpolation or a Taylor Series representation of the area function.

FIG. 5 illustrate a GPS-based controller module 200 for a grading controller application. A GPS receiver 202 provides latitude and longitude information on signal line 204. Altitude information is provided on signal line 206. The map/logic circuit 208 converts geographic latitude and longitude information corresponding to, for example, either a grid system, as illustrated in FIG. 3 herein above, or a coordinate system such as illustrated in FIGS. 6A and 6B. FIGS. 6A and 6B show a position of a user as distance-along-a-track-centerline 220 and distance 222 along a cross-track line relative to the centerline 220. FIGS. 6A and 6B are useful, for example, in road building and road grading operations.

The map/logic means 208 provides predetermined desired altitude information on output signal line 210 as a function of the geographic position of a user. The map/logic means 208 includes a subtractor circuit 212 for combining the actual altitude information on signal line 206 from the GPS receiver 202 with the predetermined desired altitude information from the map 208 to provide grading information on an output signal line 214 to a grader operator. This information, for example, directs the operator to cut 5 cm from the existing grade at a particular location. The map 208 is loaded with the desired grade.

FIG. 7 illustrates a GPS-based controller module 250 for zone-based applications where a GPS receiver 252 provides location information on a signal line 254 to a mapping circuit 256, which uses closed areas to define zones having common characteristics. The closed areas include polygons, circles defined by center points and radii.

Some application of the closed area maps include zone-based charges to customers of messenger and delivery services. Such zones include the well-known U.S. Postal Service's zone-improvement-plan (ZIP) zones described as ZIP codes.

The zone-based concept is extended such that the GPS receiver provides time information as well as geographic position information on signal line 254. Predetermined discrete logical output values corresponding to the user geographic position and time information are provided by the mapping means 256.

The mapping means 256 uses closed volumes to define zones having common characteristics. The closed volumes include polyhedral and cylinders defined by a centerline and a radius that corresponds to distance along the centerline. The map means can include a zone defined as a route specified as distance along-a-track-centerline, a maximum distance cross-track right or left relative to the centerline, and a maximum and minimum allowable time relative to distance along-a-track-centerline. The map means can include means for automatically tracking the geographic position of a user and setting a user time clock to a standard time zone based on the current geographic position of the user. This provides for automatic correction of a users clock when a different time zone is entered.

The invention provides a technique for obtaining route and schedule adherence. An application of this technique is providing an alarm signal that is emitted if a cargo vehicle arrives at an intermediate or final destination area (described by a zone) either too early or too late. This concept can be extended to a time/crosstrack "tunnel" about a centerline that describes the route.

The various embodiments of the invention described herein above are implemented, for example, using one of a series of commercially available GPS system modules provided by Trimble Navigation Ltd. of Sunnyvale, Calif. These fully functional integral modules are called the "SVeeSix" Modules and include a complete multi-channel GPS receiver, an onboard programmable microcomputer usually used for navigation functions, and a 2M-byte EPROM memory. A portion of the memory is reserved and made available for external loading of map information through a serial port. The logic and decision functions are implemented with the on board microcomputer, programmed appropriately to provide desired control functions and output signals, as required, in an appropriate format such as, for example, a RS232C format. The module includes a circuit board on which are integrally mounted the various system components for providing an integral GPS-based controller module according to the invention.

FIG. 8 shows an integral GPS-based controller module 800 which includes a global positioning system (GPS) receiver 802 for providing at an output terminal thereof geographic information corresponding to a respective geographic position of the controller module. A map means 804 and a logic means 806 each have an input connected to the GPS output. The map means 804 has an input terminal, connected to the output terminal of the GPS receiver, for receiving geographic position information data from the GPS receiver. The logic means 806 has a first input terminal connected to the output terminal of the GPS receiver and has an output terminal for providing a plurality of multi-valued predetermined logic output values corresponding to geographic position information. The logic means 806 has a second input terminal connected to an output terminal of the map means 804. The GPS receiver 802, the map means 804, and the logic means 806 are combined as an integral unit in a single module.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. An intergral GPS controller module provided in a single module, comprising:

a global positioning system (GPS) receiver for providing at an output terminal thereof geographic information corresponding to a respective geographic position of a user;

map means, having an input terminal, connected to the output terminal of the GPS receiver, for receiving geographic position information data from the output terminal of the GPS receiver and for providing output map information;

wherein the map means provides a predetermined functional representation of a characteristic as a function of geographic position;

wherein the map means uses zones defined by a route specific by a distance along the centerline of a track and maximum distance across the track relative to said centerline;

logic means, having a first input terminal connected to the output terminal of the GPS receiver and having an output terminal for providing predetermined logic output values corresponding to geographic position information;

wherein said map means has as output terminal, connected to a second input terminal of the logic means, for providing the logic means with output map information; and wherein said GPS receiver, said map means, and said logic means are combined as an intergral unit in a single module.

* * * * *